United States Patent [19]

Skelland

[11] Patent Number: 5,229,004
[45] Date of Patent: Jul. 20, 1993

[54] STABILIZING OF LIQUID MEMBRANES FOR SEPARATION PROCESSES WITHOUT SACRIFICING PERMEABILITY BY NON-NEWTONIAN CONVERSION OF THE MEMBRANE

[75] Inventor: Anthony H. P. Skelland, Atlanta, Ga.

[73] Assignee: Georgia Tech Research Corporation, Atlanta, Ga.

[21] Appl. No.: 914,861

[22] Filed: Jul. 15, 1992

[51] Int. Cl.$^5$ .................. E01D 61/38; E01D 61/40
[52] U.S. Cl. ...................... 210/643; 210/500.36
[58] Field of Search ............ 406/46, 47, 197; 210/643, 500.21, 500.27, 500.36

[56] References Cited

U.S. PATENT DOCUMENTS 5,080,534  1/1992  Goodson et al. .................. 406/197

Primary Examiner—Frank Sever
Attorney, Agent, or Firm—Hopkins & Thomas

[57] ABSTRACT

A method and a liquid membrane is disclosed, in a liquid membrane separation process, for enhancing the stability of the membrane without any significant loss in solute permeability rate through the membrane, by converting the membrane liquid to suitable non-Newtonian form by the addition of a high molecular weight polymer.

20 Claims, 10 Drawing Sheets

Emulsion liquid membranes

Schematic of Liquid membrane for phenol and acid extraction

Effect of PIB on benzoic acid extraction at 2% Span 80

Time, min.
Effect of polymer on benzoic acid extraction

Effect of PIB on the extraction of benzoic acid

Effect of polybutadiene on the extraction of benzoic acid

Comparison of a membrane containing a surface active copolymer (EVA) of low molecular weight (2000) & high concentration (10%) with my membrane containing non-surface active polymers of high molecular weight & low concentration.

Phenol Extraction with different membranes

STABILIZING OF LIQUID MEMBRANES FOR SEPARATION PROCESSES WITHOUT SACRIFICING PERMEABILITY BY NON-NEWTONIAN CONVERSION OF THE MEMBRANE

FIELD OF THE INVENTION

This invention relates to the area of chemical separation technology. In particular, the invention relates to liquid membranes that may be used to recover or remove dilute components from a wide range of fluids. More specifically, the invention is drawn to non-Newtonian liquid polymeric membranes for decontaminating water, blood or other fluids.

BACKGROUND OF THE INVENTION

Liquid membrane separation processes constitute an emerging technology with unusually widespread applications that include the separation of hydrocarbons, wastewater treatment, recovery and purification of metal ions, oil well control, and biomedical applications such as the artificial kidney, removal of phenolic and other toxins from blood, the treatment of drug overdose, and the timed release of enzymes and drugs.

Thus, how to detoxify industrial waste water by removing its wide variety of contaminants, such as organic and mineral acids, phenolic compounds, amines, ammonia, various metal ions and salts, including phosphates, chromates, nitrates, nitrites, sulfates, and chlorides, has been a recurring and widespread problem. Emulsion liquid membrane processes have been shown to be effective in such applications.

Although the principle of the invention will be primarily illustrated with reference to emulsion or unsupported liquid membranes, it will be evident that the ideas involved may be easily adapted to the so-called immobilized or supported liquid membrane. The latter is formed when a liquid is impregnated in the pores of a porous solid for mechanical support (Noble and Way, 1981, Ch.1).

Unsupported or emulsified liquid membrane systems consist of a solute receptor phase, emulsified or encapsulated as fine droplets of perhaps 1 μ in diameter, in another immiscible liquid. Globules of this emulsion, often having diameters of 0.1–5 mm, are dispersed in a third liquid phase containing the solute to be removed. The latter is called the continuous or donor phase, and solute travels from the external donor to the internal receptor phase through the intervening immiscible liquid which, because of its selective barrier function, is referred to as a liquid membrane. Ideally there is no direct contact between the encapsulated and continuous phases, which are commonly miscible in each other. The insulation of these two phases from each other depends on preserving the stability of the intervening immiscible liquid membrane, accomplished by the presence of an appropriate surface active agent, initially in the membrane phase. To maintain a solute concentration gradient across the membrane the solute is often caused to react chemically with a reagent in the receptor phase, giving a product that is insoluble in the membrane liquid, so preventing its countertransfer back to the donor phase. "Carrier" agents are sometimes added to the membrane phase to solubilize otherwise insoluble solutes, thereby facilitating their transport across the membrane as complexes.

FIGS. 1 and 2 illustrate the terminology and experimental procedure for an organic membrane phase, and FIG. 3 specifically shows the removal of phenol or acids from wastewater as merely one example of such processes.

However, a major stumbling block permeates the whole liquid membrane field; it lies in preserving the stability of the liquid membrane against rupture or breakage, thereby permitting leakage of the internal or receptor phase back into the external or donor phase, thus nullifying the solute separation already achieved. Such membrane rupture is promoted by the agitation shown in FIG. 2 and/or by inappropriate formulation of certain components, such as insufficient surfactant, or membrane liquids of too low viscosity. Two remedies for this problem are currently in use, but they are known to be far from ideal, as follows:

The first current remedy: Increase the concentration of stabilizing surfactant in the membrane phase.

Unfortunately this reduces the rate of solute transfer by inhibiting any internal motion within the emulsion globules, and by setting up both mechanical and adsorptive barriers to solute transfer at the interfaces between the membrane and the inner and outer phases.

In addition, surfactants have been found to decrease the rate of interfacial chemical reactions like that in FIG. 3. (Nakashio et al., 1988).

The second current remedy: Increase the viscosity of the membrane phase.

Numerous workers (e.g.; Terry et al, 1982; Frankenfeld et al, 1976; Yang and Rhodes, 1980) have found that membrane stability increases but transfer rates decrease substantially as the membrane viscosity is increased. This is to be expected from the Eyring-Stokes-Einstein relation for molecular diffusivity in Newtonian liquids (Skelland, 1985, pp 54–5):

$$\text{Diffusivity} = (\text{constant}) \left( \begin{array}{c} \text{a function of} \\ \text{molecular} \\ \text{parameters} \end{array} \right) (T\,°K.)/\text{viscosity} \quad (1)$$

Evidently a ten or twenty-fold increase in membrane viscosity decreases the molecular diffusivity to around 1/10–1/20 of its value in low viscosity membranes. This has been widely observed in the liquid-membrane context (e.g. Kataoka et al, 1989).

Thus the current remedies for liquid membrane instability both tend to nullify its advantage of high permeability, the latter resulting from short transfer path, strong selectivity, and high diffusivity.

SUMMARY OF THE INVENTION

It is accordingly proposed here, for the first time, to convert the membrane phase (for example, Soltrol 220, kerosene, dodecane, or cyclohexane) to appropriate non-Newtonian form, by adding a few percent of polyisobutylene (PIB), polybutadiene (PBD), or other suitable additive, for instance in the system in FIG. 3. This will:

(A) increase the membrane consistency ("viscosity") and hence its stability;

(B) avoid the substantial reduction in diffusivity that would otherwise result if the membrane were Newtonian, as explained below; and (C) reduce the amount of stabilizing surfactant needed and thus lessen its retarding effects on both the transfer rate and the chemical reaction rate at the receptor phase interface. Reduction in the problem of "swelling" also follows.

The general procedural outline for unsupported liquid membranes is therefore as follows, with reference to FIG. 2.

Dissolve the (possibly reduced) amount of stabilizing surfactant in the liquid membrane phase. (Span 80 has found application in some organic membranes).

2) Follow with the additive needed for conversion to the appropriate non-Newtonian form.

3) Add the internal phase with agitation as needed to make the emulsion described above.

4) Disperse the emulsion in the external phase containing the solute for transfer to the internal phase, using agitation when appropriate. (Internal medicinal use would obviously preclude applied agitation).

5) After a suitable transfer period, allow the solute-depleted external phase and the emulsion to settle into two layers and separate.

6) Recover the membrane phase for reuse, and the solute—enriched internal phase for disposal or further processing, by breaking the emulsion—e.g. by heating, centrifuging, or electrical means.

The key difference from all previous approaches lies in step 2, above, although steps 2 and 3 may be interchanged depending on the ease of emulsion formation in a given system. This key difference exploits findings that solute diffusivities in dilute polymer solutions are largely unaffected by the increase in overall consistency ("viscosity") caused by the dissolved polymer. This is in vivid contrast to the Newtonian fluid situation, represented by equation (1), and is explained in terms of internal structuring of the solution by the dissolved polymer, in a manner facilitating solute transport (Osmers and Metzner, 1972). Even more remarkable is the increase sometimes found in molecular diffusivity with increase in the consistency and non-Newtonian nature of such solutions with low but increasing polymer concentration (Astarita, 1965; Metzner, 1965; Ponter and Davies, 1966; Barlage, 1969).

Specifically, by "low polymer concentration" is meant the use of dilute polymer concentrations in the membrane phase, below what has been called the "critical concentration" at which the polymer molecules begin to overlap. Relatively small increases in polymer concentration above this "critical" value result in the polymer molecules becoming more entangled, until finally they form a network through the membrane. This condition is to be avoided by using dilute polymer concentrations below the "critical" value, thus avoiding solute impedance through the membrane by any such network. Thus the invention corresponds to use of polymer concentrations of only a few percent.

In their recent authoritative review of the field, Frankenfeld and Li (1987, p. 846) reiterate the widely accepted ". . . need for trade-offs between extraction rate and emulsion stability in nearly all liquid membrane processes." However, this invention shows, for the first time, that the need for such trade-offs can be eliminated by conversion of the liquid membrane to suitable non-Newtonian form. This new approach greatly increases stability without sacrificing permeability. It removes the last stumbling block to the commercialization of liquid membrane technology.

DETAILED DESCRIPTION OF THE PREFERRED EMBODIMENT

The invention comprises a non-Newtonian liquid membrane that combines high stability with high permeability, to a substantially greater degree than previously known.

The membrane comprises a dilute solution of an appropriate polymer in a solvent which also contains a dissolved surfactant.

The non-Newtonian membrane of the present invention is formed by converting a Newtonian liquid to a non-Newtonian liquid through the addition of a converting chemical that is a suitable polymer. Exemplary starting Newtonian liquids include kerosene, dodecane or cyclohexane when an organic membrane is appropriate. One such starting Newtonian material is Soltrol 220, an iso-paraffin oil that may be obtained from Phillips Petroleum Company. It may be desirable to adjust the viscosity of the Newtonian fluid by adding a more viscous hydrocarbon oil to the Newtonian fluid prior to adding the converting chemical. Examples of such viscous oils include S500N and S100N, both of which are obtained from Exxon. (Of course, in other applications, an aqueous membrane may be required, as when components are to be transferred from one organic phase into another, across an intervening aqueous membrane.)

A wide range of polymer types is useful; good results have been obtained using high molecular weight non-polar homopolymers, as shown in examples 1–5 below. It is to be understood, however, that other forms of polymer, such as high molecular weight copolymers, are not excluded.

Polymeric stabilization of dispersions has been found to increase with increasing molecular weight of the polymer, while the "critical concentration", $C_c$, decreases with increasing molecular weight for a given polymer. Polymer molecular weights between about 10,000 and 2 ½ million are here specified, preferably between about 100,000 and 2 ½ million.

The polymer concentration to be used in the membrane must be below the "critical concentration," $C_c$, at which significant overlap of polymer molecules in solution begins, as noted earlier. This corresponds to polymer concentrations of only a few percent (commonly less than 3%; however, to determine a suitable polymer concentration in a given case, one must proceed as follows:)

Figure 4:
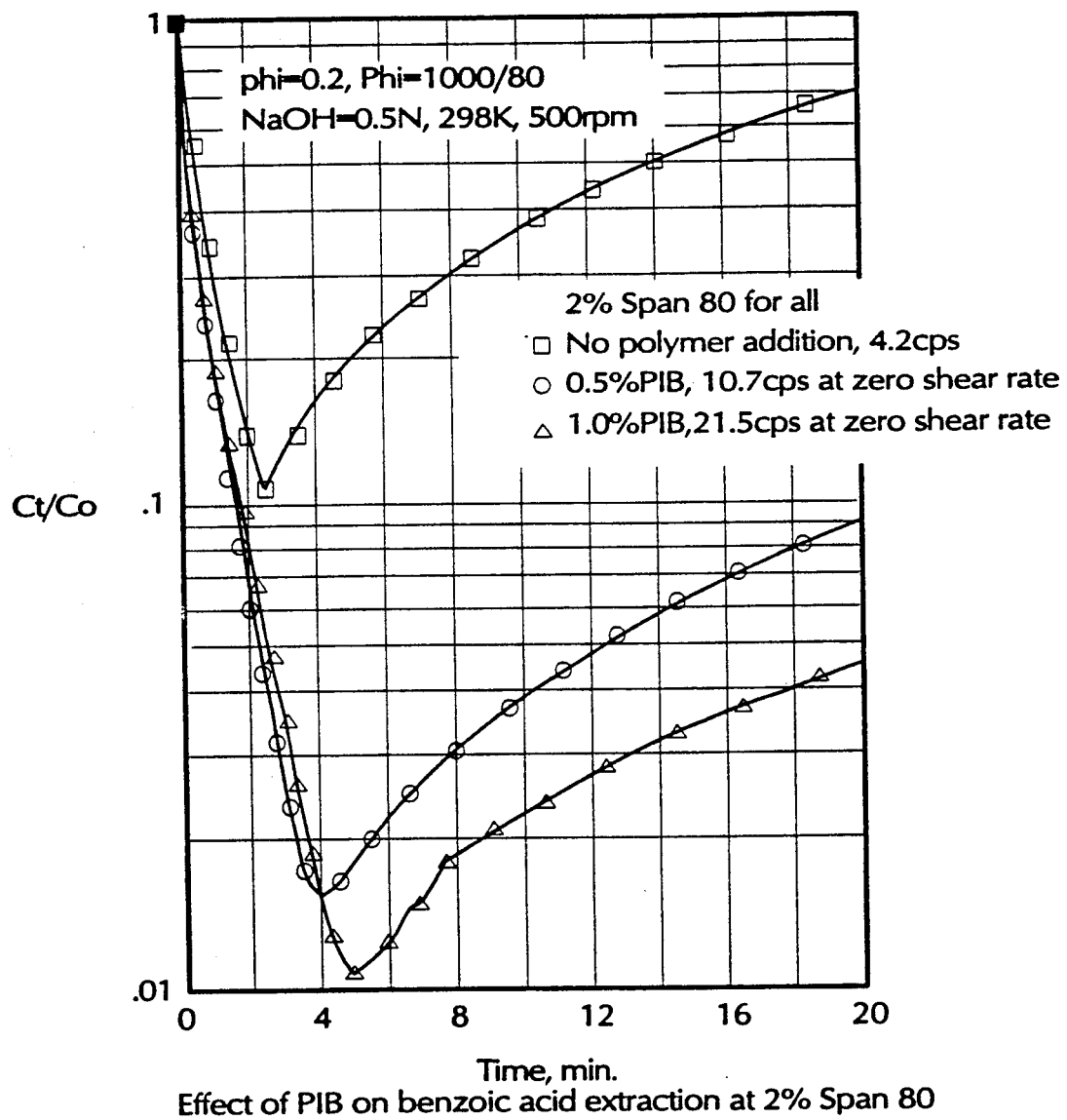
FIGS. 4–11 illustrate experimental results in graph form.

That operation in the right polymer concentration range has been achieved in a given application is readily recognized by a preliminary glassware-scale run such as my Example 1. Results such as FIG. 4 show enhanced stability (greater extraction), coupled with negligible or no reduction in transfer rate [i.e, the attainment of a given value of $C_t/C_o$ in the same (or less) time as that obtained without polymer in the early stages of the process]. The absence of reduction in solute transfer rate shows the absence of any impeding polymer network in the membrane, and hence that the polymer concentration is indeed below $C_c$.

The liquid membranes of the present invention may include a stabilizing surfactant. Numerous surfactants may be used, including anionic, cationic, or nonionic surfactants, many of which are listed in *Surface Chemistry* by Lloyd I. Osipow, Reinhold Publishing Company, New York (1962), Chapter 8; and *Surface Activity*, Moilliet et al, Van Nostrand Company, Inc. (1961), Part III.

The surfactant should be incorporated into the membrane phase of the emulsion at about 1 to 5 weight %. Examples 1-5 below feature organic liquid membranes made of various isoparaffinic solvents containing small concentrations of appropriate polymer and 2-5% of the nonionic surfactant Span 80 (sorbitan monooleate), supplied by Emulsion Engineering. This surfactant is soluble in the organic membrane phase.

More details of application, procedure, and data interpretation will become clear from the experimental results provided in my Examples 1-5 below.

EXAMPLES IN THE FIELD OF INDUSTRIAL WASTEWATER TREATMENT

I. Materials and Experimental

1.) Materials

The membranes were mainly made of Soltrol 220, an isoparaffin oil (mixture of C13-17 hydrocarbons) with high flash-point (222° F.) from Phillips Petroleum Company. The adjustment of the viscosity in Newtonian fluid systems was achieved with addition of either S500N or S100N, both of which are neutral hydrocarbon oils-Newtonian fluids with higher viscosity, provided by Exxon Company. The physical properties of the oils used are listed in Table 1.

TABLE 1

| Physical Properties of the Oils Used | | | |
|---|---|---|---|
| Property | Soltrol 220 | S100N | S500N |
| Boiling point, °F. | 450–550 | ~520 | ~620 |
| Specific Gravity 60/60° F. | 0.809 | 0.86 | 0.88 |
| Molecular weight (average) | NA | 370 | 500 |
| Viscosity, cp (100° F.) | 3.7 | 36.9 | 197.5 |
| Viscosity, cp (Exp., 295K) | 4.2 | 38.2 | 230 |

The conversion of the fluid from Newtonian into non-Newtonian was made by addition of either polyisobutylene (PIB), EL-100 from Exxon with average molecular weight of 1.25 million or polybutadiene (PBD) from Polymer Scientific with average molecular weight of 940,000. The apparent viscosity of these non-Newtonian fluids at zero shear rate, with <3% polymer, increases by 10 to 100-fold.

Span 80, sorbitan monooleate from Emulsion Engineering, was chosen as the surface active agent throughout all of the examples because of its wide usage in ELM studies.

2.) Procedures

The solutions of either polymer in Soltrol 220 were prepared by dissolving small pieces while stirring. Addition of S500N and S100N could be achieved by simple mixing. The membrane phase was made by mixing the proper amount of Soltrol 220 oil, either S500N or S100N, and concentrated polymer solution, as well as Span 80. The internal phase was either aqueous sodium hydroxide for acid and phenol extraction, or aqueous acid for the extraction of ammonia. While stirring the membrane phase magnetically, the internal phase was added with a 10 mL pipet. The mixture was then emulsified with an XL2020 ultra-sonicator from Heat Systems. The machines' energy output was fixed on 20% because of the mini-tip and the emulsifying program was run as "3 second-on-and-2-second. off" so that the change in the emulsion temperature was not significant. Total emulsifying time was usually 5 minutes.

The extraction was carried out in a cylindrical, flat-bottom glass vessel, with a diameter of 110 mm and height of 150 mm. Four baffles, each 10 mm wide, were placed at 90° intervals to prevent vortex formation. A six flat-blade turbine impeller with diameter of $7.64 \times 10^{-3}$ meters was centrally mounted in the vessel since this type of impeller showed the best dispersion performance for uniform mixing. The experimental Agitator Model ELB manufactured by Bench Scale Equipment Company was used to mix the liquids. The unit was equipped with a ¼ hp drive motor, and provided an infinitely variable output speed of 0-18 rps. The speed control was calibrated directly in rpm with a tachometer.

For the extraction of benzoic acid and ammonia the conductance of the continuous phase was measured by an electrical conductivity cell constructed from two 7 mm diameter glass capillary tubes 21 cm in length, both parallel and side by side, each containing 15 mm of 20 gauge platinum wire exposed at one end. A glass bead was placed at the tip of the platinum wires to prevent them from moving in the turbulent flow field. The platinum wire was spot welded to a nickel-copper wire which ran the length of the capillary tube. The cell constant was determined to be 0.821/cm. The cell was connected to a Yellow Spring Instrument Conductivity Meter Model 32. The output was then recorded by a Fisher Recordall Series 5000 strip chart recorder. The conductance measurement has been evaluated and shown to be an accurate and convenient method to monitor the mass transfer if the dissociation of the transferring solute is properly considered. The relationship between solute concentration in the external phase and the conductance was calibrated before the study. The calibrated relationship can also be evaluated with the dissociation constant of the solute and the equivalent conductances of the corresponding ions. The effect of the dispersed phase on the conductance reading of the continuous phase was allowed for by the well-known Maxwell equation. Therefore, the solute concentration in the external phase at any time during the process could be directly evaluated for the membranes with negligible leakage. When the leakage rate cannot be ignored, calculation of the solute concentration also requires information on membrane leakage.

For the extraction of phenol, samples were taken from the reaction vessel during the extraction with an open. mouth syringe. Each sample was about 3 mL and was separated in the sampler within several seconds. The continuous phase was then poured on to filter paper, which was placed on a beaker, and a clear sample was obtained. After adding a certain amount of HCl, the concentration was determined with a HP8451A spectrophotometer.

The whole extraction system was located in a water bath to maintain the temperature at 298° K. When the system was at the required temperature, the agitation was started and both the conductivity meter and recorder were turned on before the membrane phase (emulsion) was rapidly poured from a beaker into the continuous phase while stirring continued.

II. Results

Section I. Extraction of Benzoic Acid

In all examples in this section, the initial concentration of benzoic acid in the feed (external) phase was 500 ppM and NaOH in the internal phase was 0.50N. The volume ratio of internal phase to the emulsion was 0.2. The treatment ratio for extraction was 1000 mL/80 mL (feed phase/emulsion). The concentrations of both polymers and surfactant are expressed in percentage of weight in volume (i.e., 1% means gram in 100 mL). The extraction processes are all interpreted as $C_t/C_o$ vs time. $C_t$ is the solute concentration in the external phase at time t and $C_o$ is its initial concentration at time t=0. The lower the value of $C_t/C_o$, the better extraction.

EXAMPLE 1

With 2% Span 80 in the Soltrol 220 and under agitation of 500 rpm, the improvement of the membrane stability was achieved by non-Newtonian membranes with only a small amount of PIB, as illustrated in FIG. 4. Without PIB, the traditional Newtonian membrane made of Soltrol 220 with 2% Span 80 extracts for only a few minutes and then the residual concentration of the acid in the external phase increases because of high leakage of the membrane. For example, from the 3rd to the 20th minute, about 60% of the initial acid in the feed phase that had been extracted leaked back into the feed phase and was transformed into salt which could not be extracted again. This indicates that the long-term extraction efficiency with a traditional Newtonian membrane was low and not of industrial importance. In contrast, the non-Newtonian membranes with 0.5 or 1.0% PIB provided much better performance. The residual concentration of the solute in the external phase after 4 minutes of phase contact was about an order of magnitude lower than that achieved with a traditional membrane. The long-term extraction efficiency was easily maintained as better than 90%. At the same time, the mass transfer rate in the first few minutes of extraction does not show any decrease even though the consistency of the membrane (as seen from the apparent viscosity) has increased 5-fold. As a matter of fact, the addition of PIB also increases the overall mass transfer rate.

EXAMPLE 2

Figure 5:
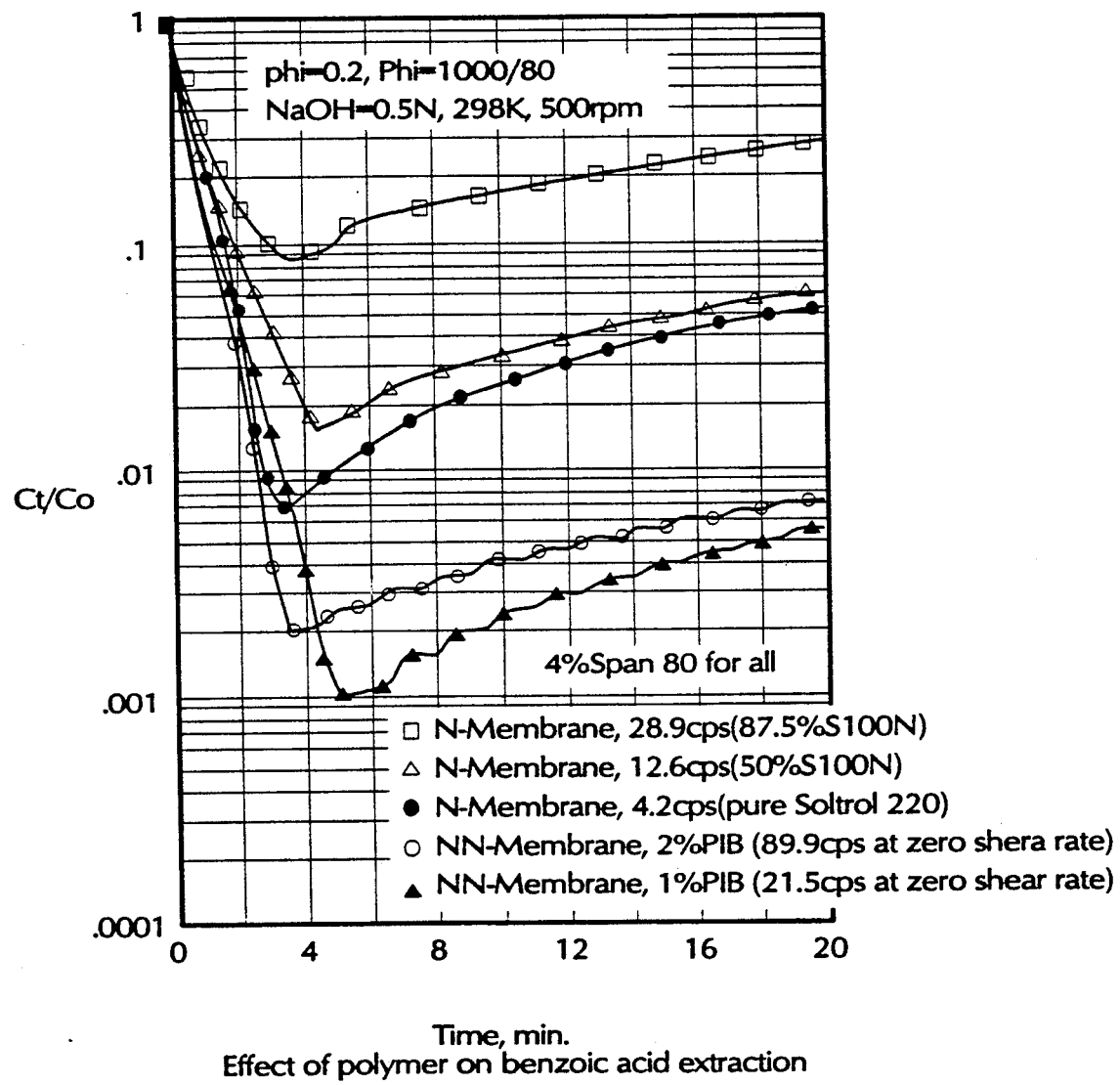

Extractions were next carried out at 4% Span 80 under the same conditions as in Example 1. Comparison between the curves of $C_t/C_o$ vs time for the Newtonian membranes consisting of Soltrol 220 and the non-Newtonian membranes consisting of 1 or 2% of PIB in the same solvent shows practically no reduction in extraction rate, despite the much higher consistency caused by the dissolved PIB (from 4.2 to 89.9 cps, a 20-fold increase), as illustrated by FIG. 5. The enhancement in membrane stability arising from the non-Newtonian conversion yields a residual acid concentration that is about an order of magnitude smaller than that for the purely Newtonian membrane at contact times beyond 4 minutes. This corresponds to an acid removal with such non-Newtonian membranes of the order of 99.9% after only 4–5 minutes of contact.

EXAMPLE 3

Figure 6:
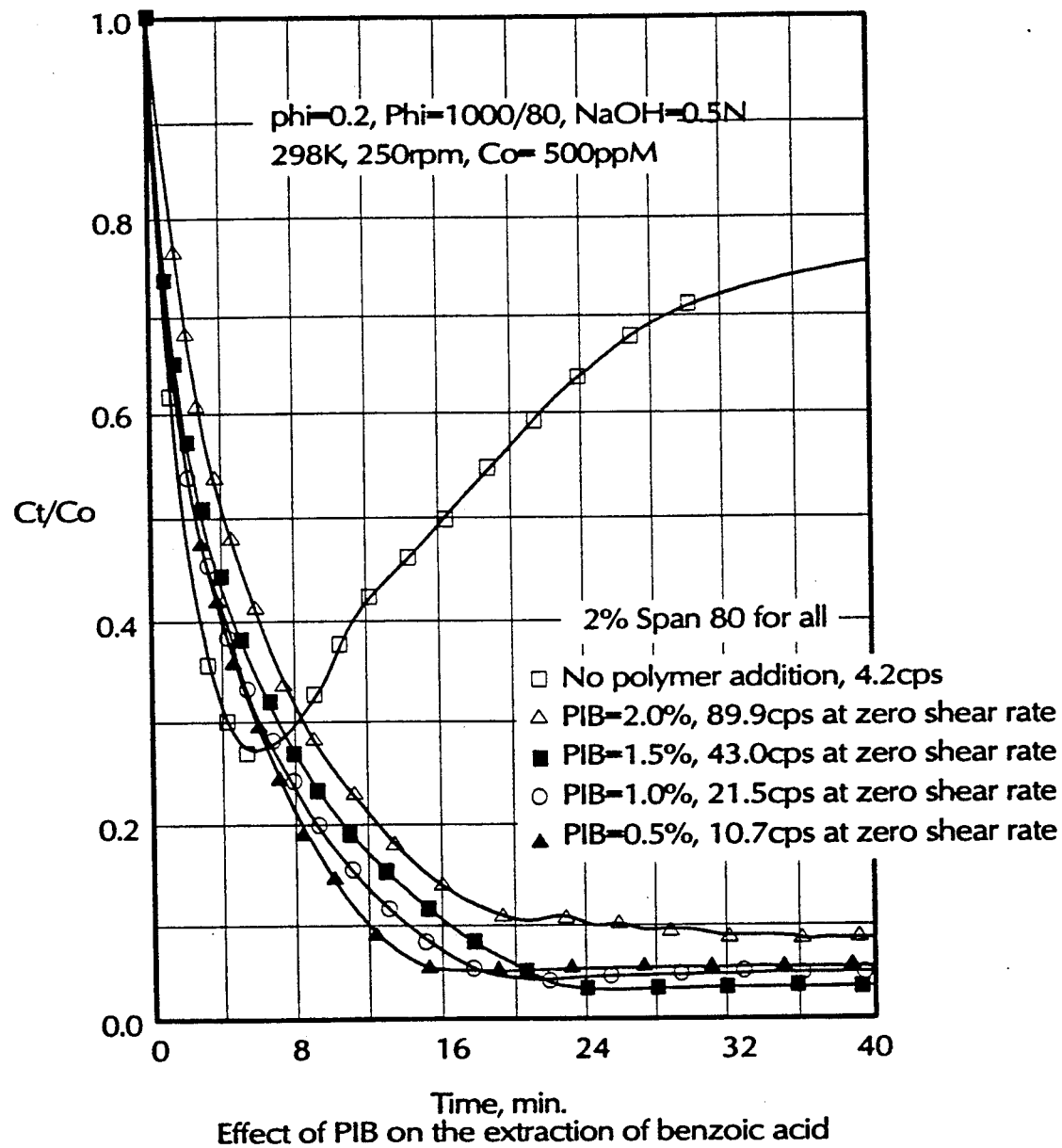
Figure 7:
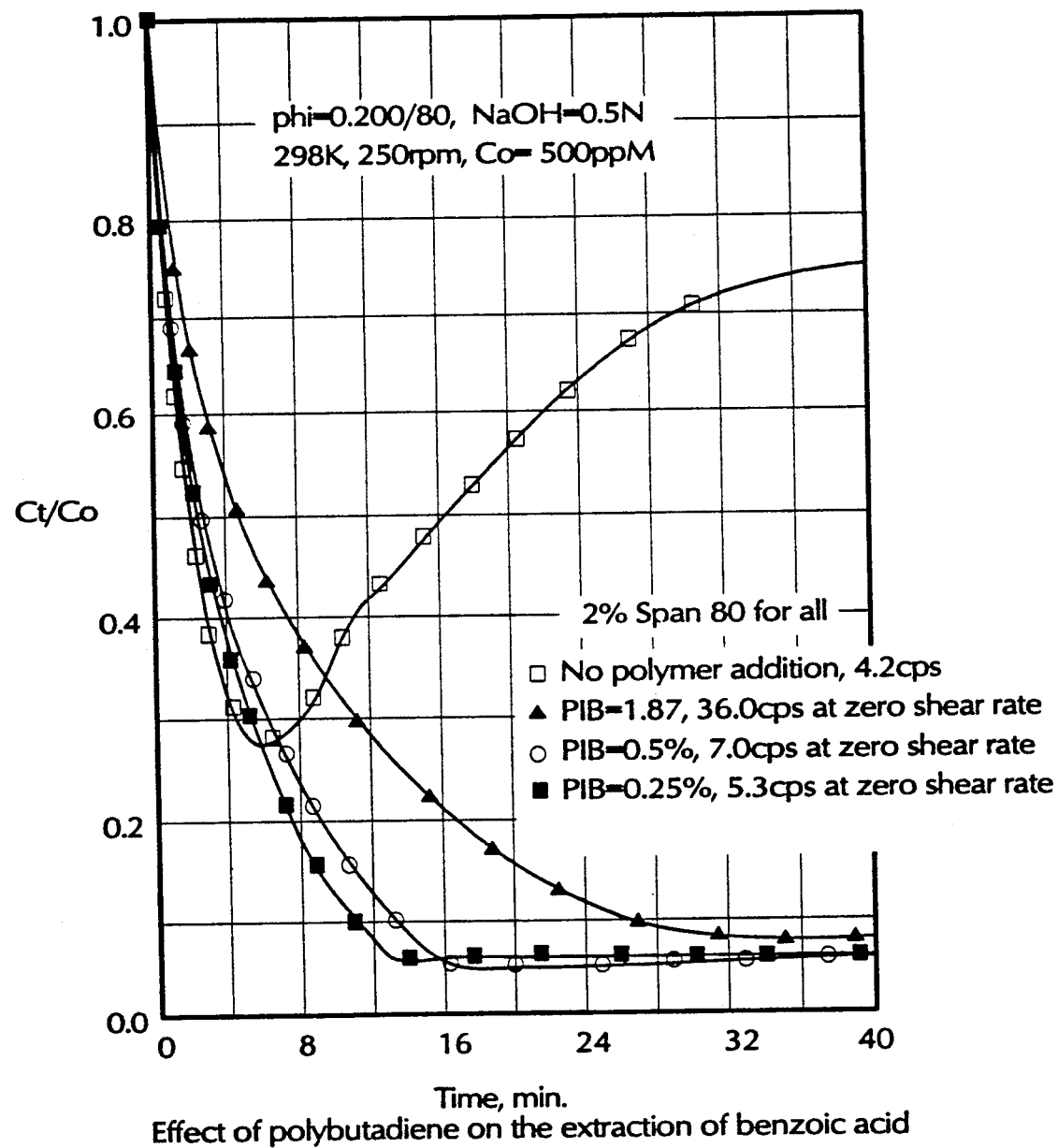

Under the less severe agitation of 250 rpm, the effects of PIB and PBD were found to be similar as in FIGS. 6 and 7. The composition of the non-Newtonian membranes, however, requires a proper amount of polymer. As can be seen from FIG. 7, some sort of network will form if too much polymer is utilized and the diffusivity and mass transfer rate are then significantly reduced.

A liquid membrane containing a much higher concentration of low molecular weight copolymer was also used for benzoic acid extraction [the copolymer was ethylene-vinyl acetate (EVA) of molecular weight 2000, containing 37% by weight of vinyl acetate, supplied by Exxon]. The extraction with this formulation was conducted and compared to mine in FIG. 8, both at room temperature. The much higher concentration of EVA resulted in the formation of a network within the membrane oil so that the mass transfer rate was significantly reduced. The results in FIG. 8 demonstrate that my formulation is different from that using EVA, in that the formation of a polymer network in the membrane is avoided by using sufficiently dilute polymer solution. The result, according to FIG. 8, was improved membrane stability and transfer rate.

Section II. Extraction of Phenol

In all extractions for phenol, the experimental conditions were the same as in Section I, except that the initial phenol concentration in the external phase was 518 ppM.

EXAMPLE 4

Figure 9:
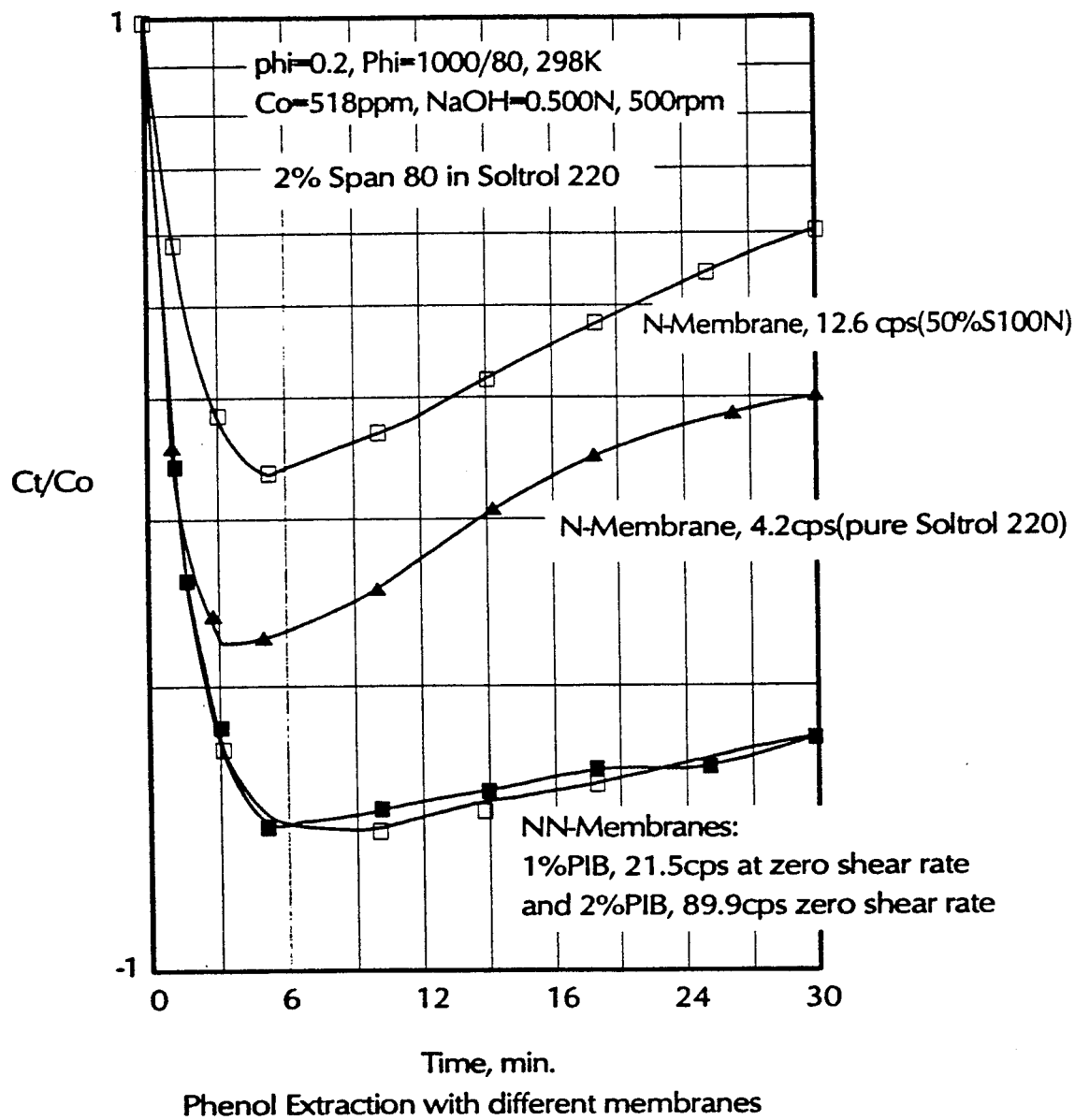
Figure 10:
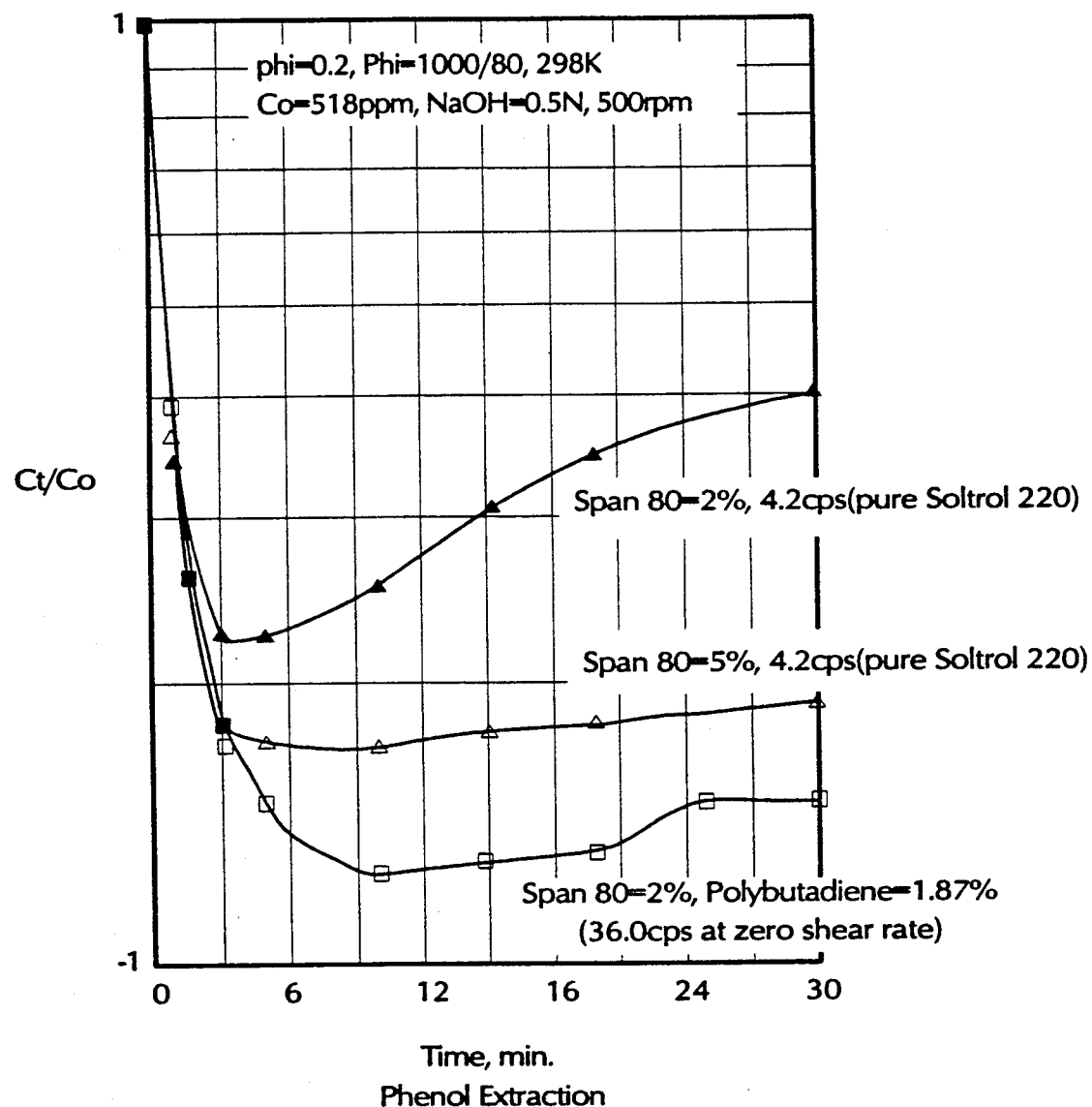

With 2% Span 80 in Soltrol 220 and under 500 rpm agitation, extractions of phenol with different membranes were conducted with the results shown in FIG. 9. Compared to the membranes made of Newtonian fluids, the membranes made of non-Newtonian fluids with addition of 1 or 2% PIB give much improved stability and no reduction in mass transfer rate. FIG. 10 shows similar improvement with the addition of 1.87% PBD.

Section III. Extraction of Ammonia

In all extractions in this section, the volume ratio of the internal phase to the emulsion was 0.2 while the treatment ratio was 1000 mL/160 mL (external phase/emulsion). The internal phase was 1.00N $H_2SO_4$ water solution. Initial concentration of ammonium hydroxide ($NH_4OH$) was always 450 ppM.

EXAMPLE 5

Figure 11:
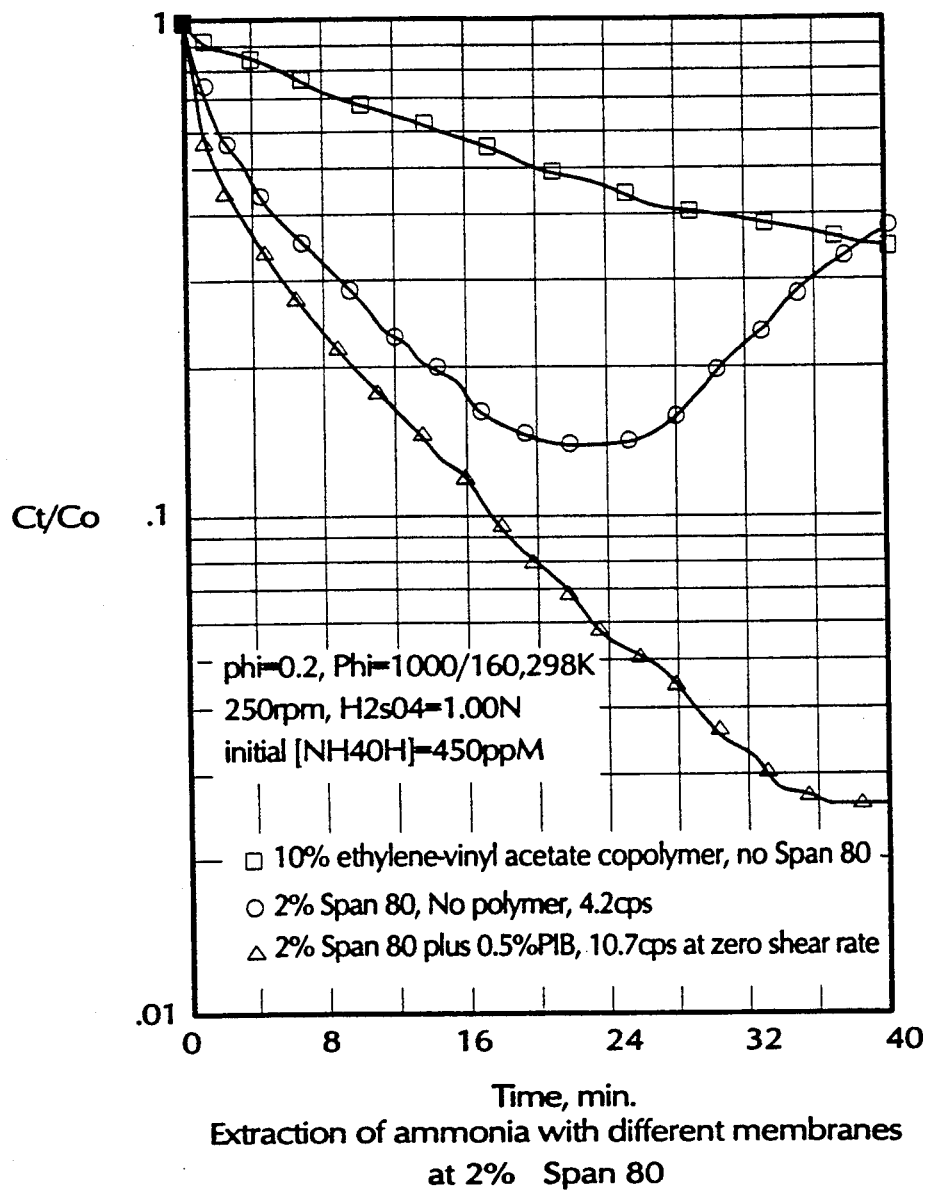
Figure 1:
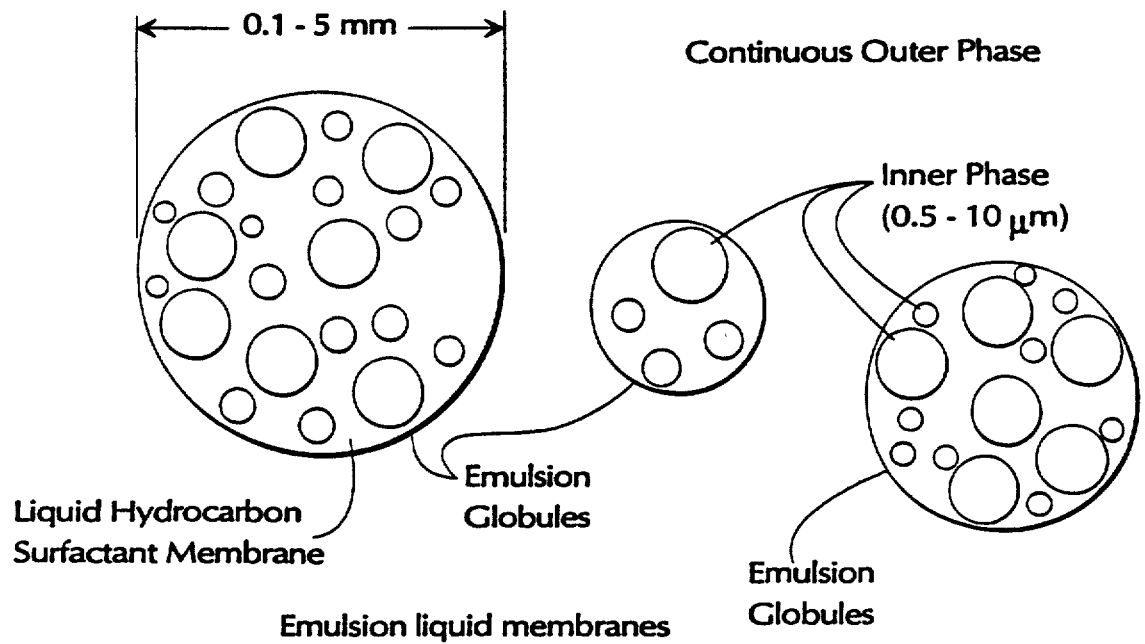
Figure 2:
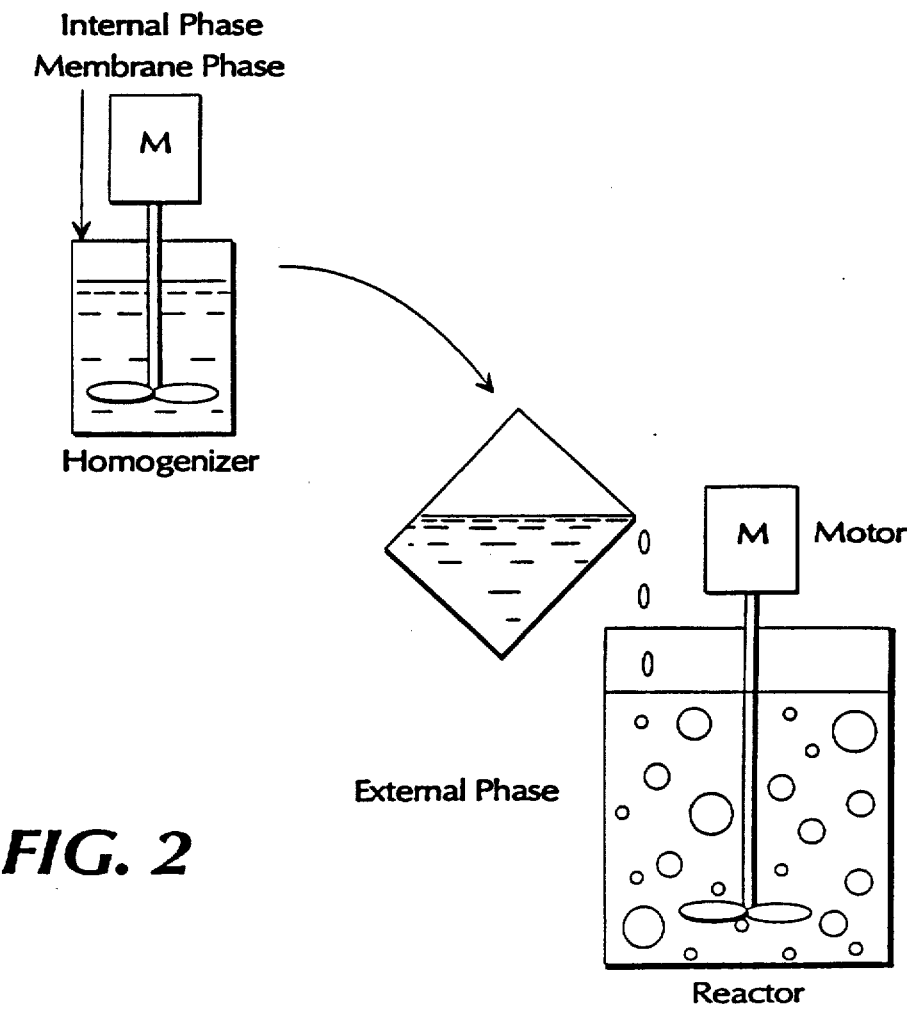
Figure 3:
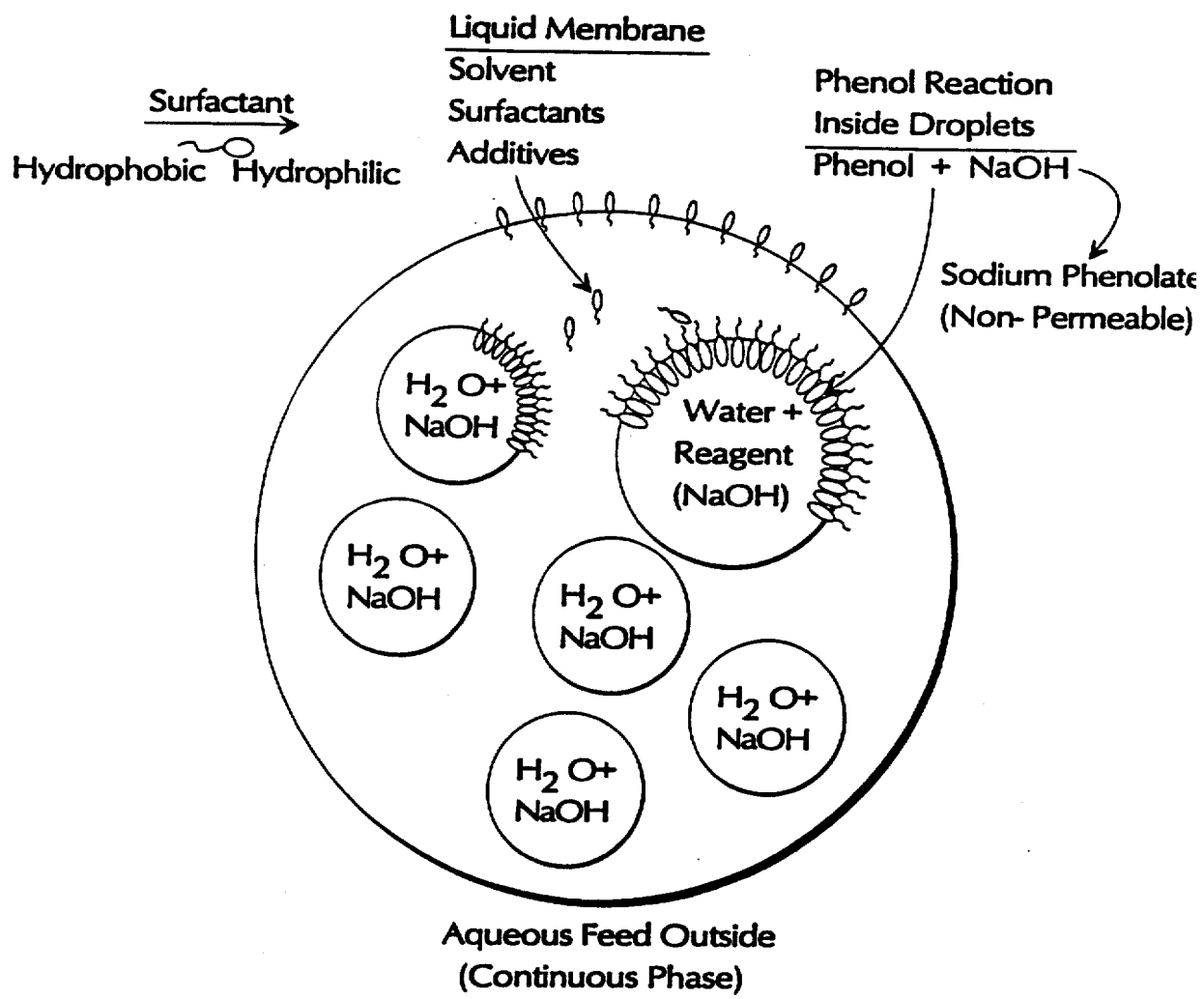
Figure 4:
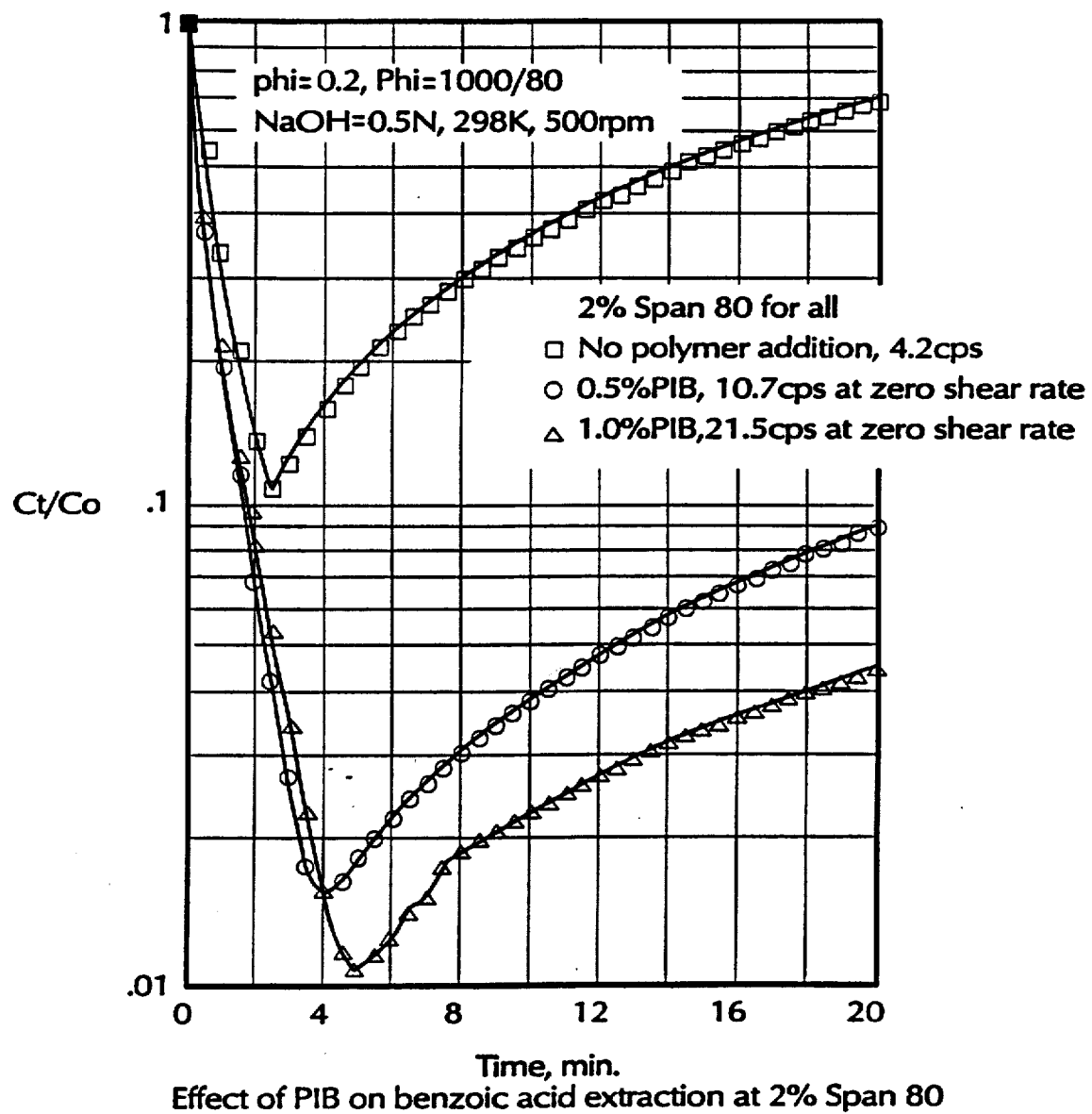
Figure 5:
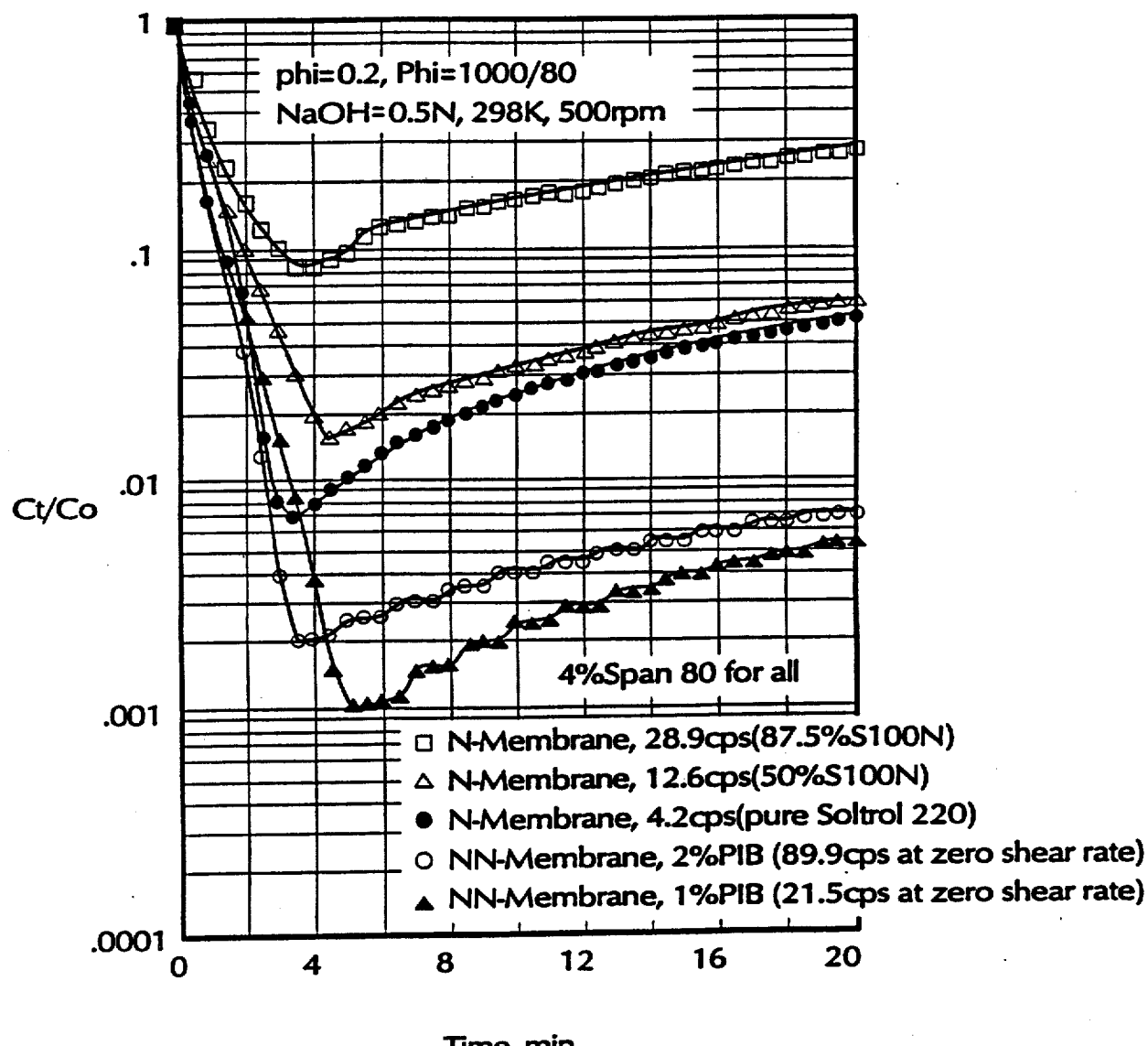
Figure 6:
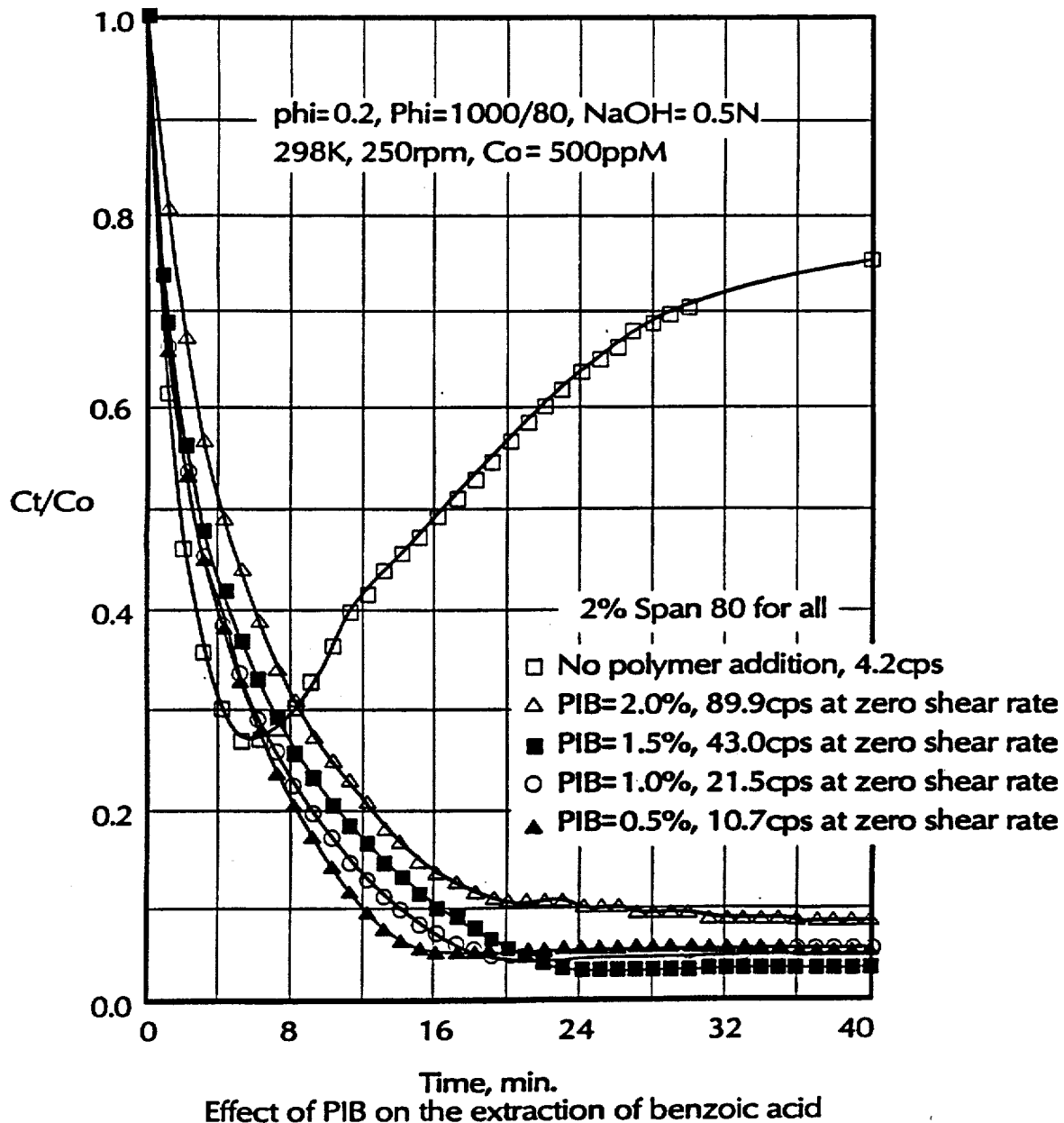
Figure 7:
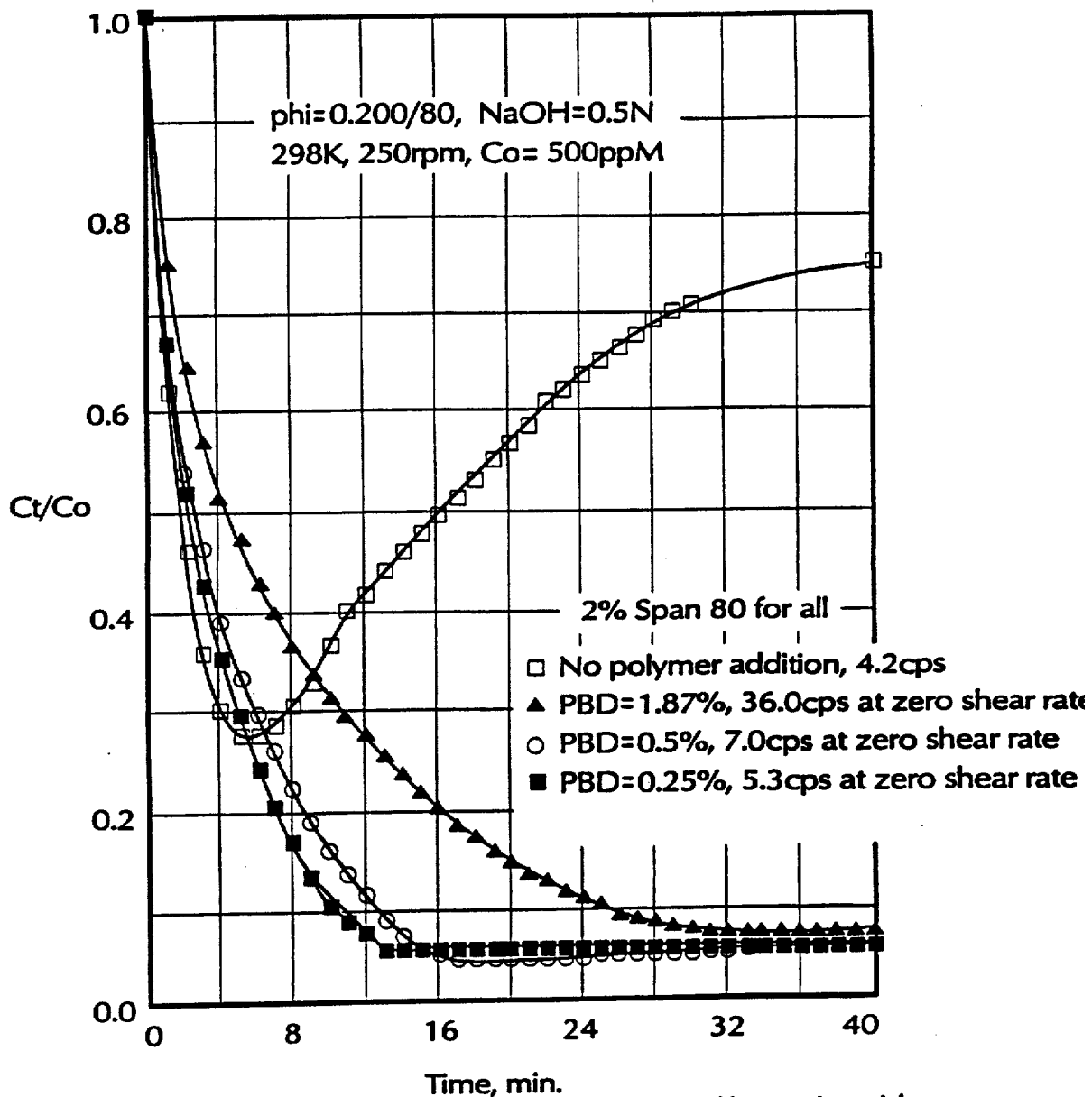
Figure 8:
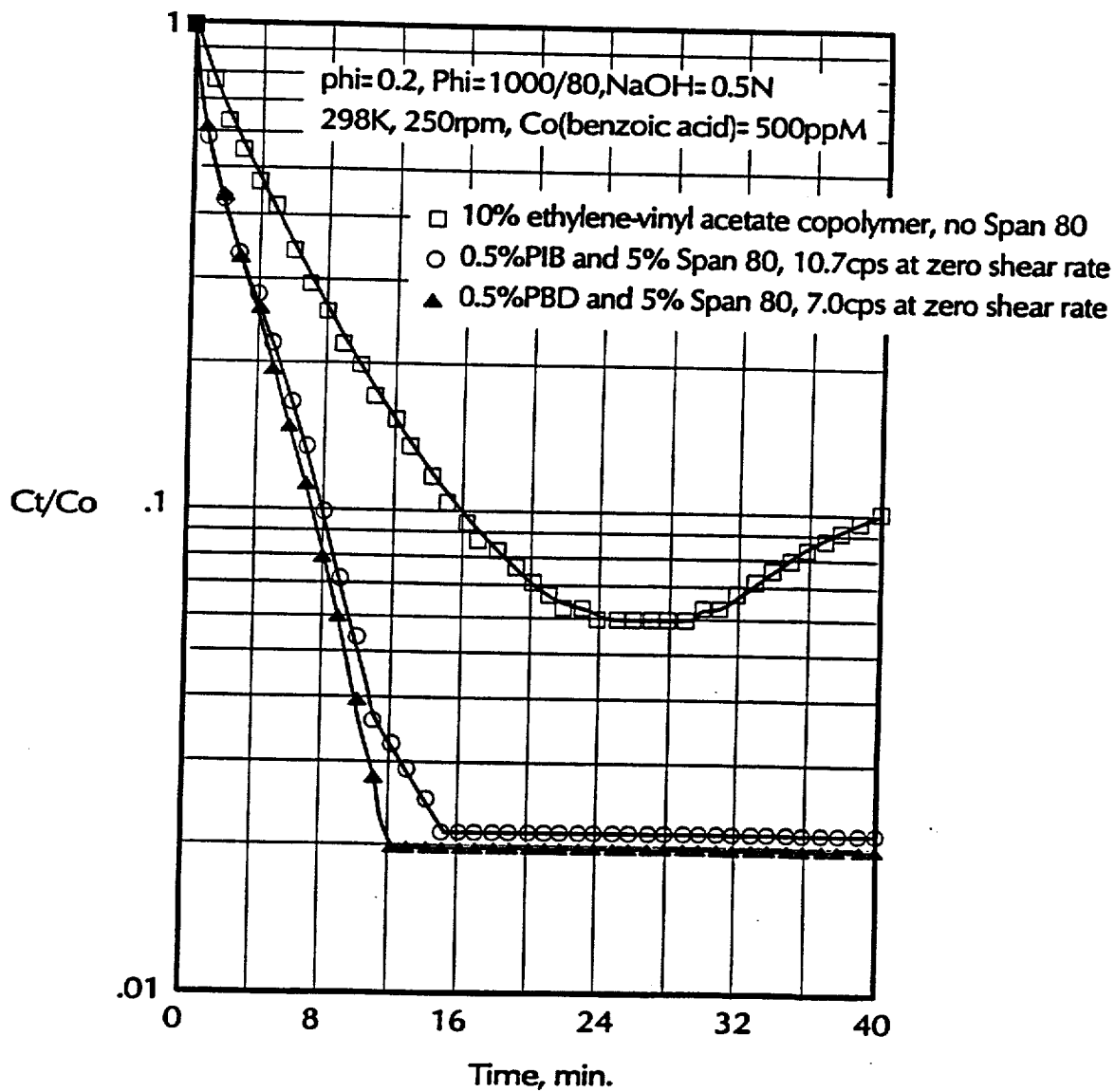
Figure 11:
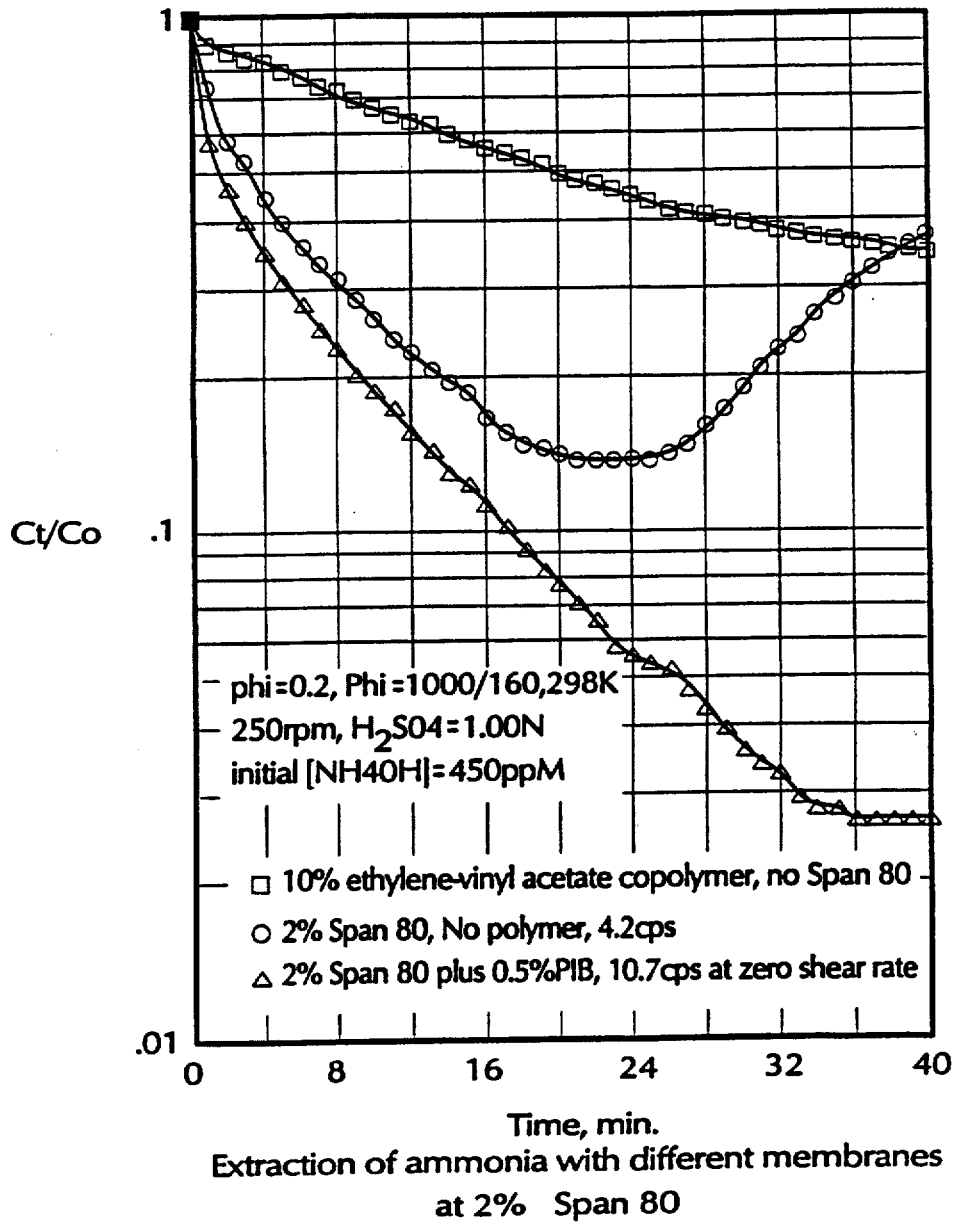

With 2% Span 80 and under 250 rpm agitation, the extractions of ammonia by a traditional membrane (no polymer addition), a non-Newtonian fluid membrane with 0.5% PIB, and a membrane with 10% EVA of molecular weight 2000, were carried out and the results are plotted in FIG. 11 The non-Newtonian membrane with 0.5% PIB not only improves membrane stability but also gives a higher mass transfer rate compared to the traditional membrane. However, the membrane containing EVA dramatically reduces the mass transfer rate. This is likely to be due to the formation of a polymer network within the membrane at the high polymer concentration used, with correspondingly increased impedance of solute transport through the membrane.

Thus, while a method for stabilizing of liquid membranes for separation processes without sacrificing permeability by non-Newtonian conversion of the membrane has been shown and described in detail herein, various changes and modifications may be made without departing from the scope of the present invention.

What is claimed is:

1. A method, in a liquid membrane separation process, comprising enhancing the stability of the membrane while substantially reducing or eliminating loss in solute permeability rate through the membrane by:
converting the membrane liquid to a pre-selected non-Newtonian form through the addition of sufficient amounts of dissolved, dilute, high molecular weight polymer.

2. A method as defined in claim 1, wherein the membrane also contains dissolved surfactant for solubilizing the solute in the membrane and enhancing the stability of the membrane.

3. A method as defined in claim 2, whereby the liquid membrane may either be an aqueous phase separating two organic phases or an organic phase separating two aqueous phases, with a solute transferring across or through the membrane from one phase to the other in either case.

4. A method as defined in claim 1 in which the solute permeability rate is enhanced.

5. A method as defined in claim 2, in which the polymer concentration in the membrane phase is below the "critical concentration" $C_c$ at which the dissolved polymer molecules beginning to overlap, as determined experimentally in a preliminary glassware-scale run.

6. A method as defined in claim 2, in which a "carrier" compound is also added to the liquid membrane, for the purpose of solubilizing a solute that is otherwise relatively insoluble in the membrane phase, thereby transporting it in complexed form across the membrane from the donor phase to the receptor phase on the other side of the membrane.

7. A method as defined in claim 2 in which said membrane is an emulsion liquid membrane or unsupported liquid membrane.

8. A method as defined in claim 2 in which said membrane is an immobilized liquid membrane or supported liquid membrane, as for instance when a membrane liquid is impregnated in the pores of a porous solid for mechanical support.

9. A method as defined in claim 1, whereby the liquid membrane may either be an aqueous phase separating two organic phases or an organic phase separating two aqueous phases, with a solute transferring across or through the membrane from one phase to the other in either case.

10. A method as defined in claim 1, in which the polymer concentration in the membrane phase is below the "critical concentration" $C_c$ at which the dissolved polymer molecules begin to overlap, as determined experimentally in a preliminary glassware-scale run.

11. A method as defined in claim 10 in which the polymer molecular weight is between 10,000 and 2 ½ million, and preferably between about 100,000 and 2 ½ million.

12. A method as defined in claim 1 in which the polymer molecular weight is between 10,000 and 2 ½ million, and preferably between about 100,000 and 2 ½ million.

13. A method as defined in claim 1, in which a "carrier" compound is also added to the liquid membrane, for the purpose of solubilizing a solute that is otherwise relatively insoluble in the membrane phase, thereby transporting it in complexed form across the membrane from the donor phase in the receptor phase on the other side of the membrane.

14. A method as defined in claim 1 in which said membrane is an emulsion liquid membrane or unsupported liquid membrane.

15. A method as defined in claim 1 in which said membrane is an immobilized liquid membrane or supported liquid membrane, as for instance when a membrane liquid is impregnated in the pores of a porous solid for mechanical support.

16. A liquid membrane for use in separating components of a mixture, the membrane comprising a Newtonian fluid and a dilute, high molecular weight polymer dissolved in said fluid in amounts sufficient for converting said fluid to such a pre-selected non-Newtonian form as to enhance membrane stability while substantially reducing or eliminating loss in solute permeability rate through the membrane.

17. A liquid membrane as defined in claim 16 in which said membrane includes a surfactant for further solubilizing the solute in the membrane and enhancing the stability of the membrane.

18. A liquid membrane as defined in claim 17 in which said polymer has a molecular weight within the range of approximately 10,000 to 2.5 million.

19. A liquid membrane as defined in claim 16 in which said polymer has a molecular weight within the range of approximately 10,000 to 2.5 million.

20. A liquid membrane as defined in claim 16 in which the solute permeability rate is enhanced.

* * * * *

UNITED STATES PATENT AND TRADEMARK OFFICE
CERTIFICATE OF CORRECTION

PATENT NO. : 5,229,004

DATED : 07/20/93

INVENTOR(S) : Skelland

Figure 1:
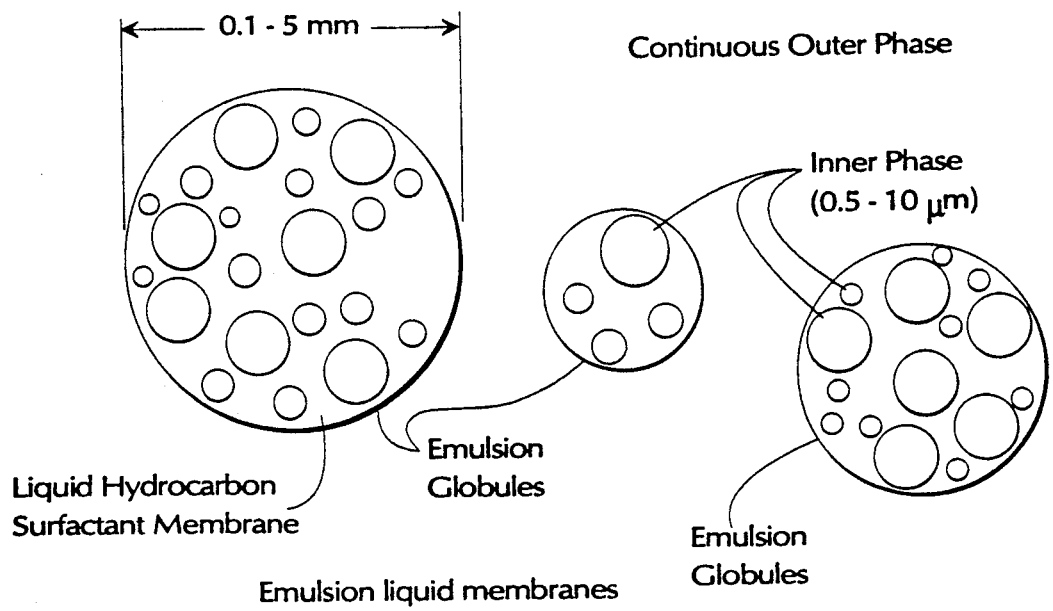
FIG. 1 is a schematic diagram of an emulsion liquid membrane.
Figure 2:
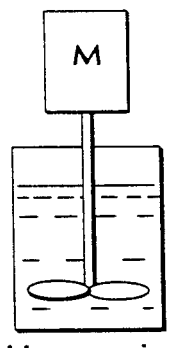
FIG. 2 is a schematic diagram of the experimental apparatus.
Figure 2:
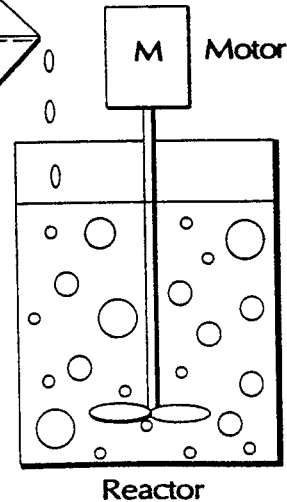

It is certified that error appears in the above-identified patent and that said Letters Patent is hereby corrected as shown below:

On sheet 1 of 10, Fig. 2, add an arrow from "Membrane Phase" to the container, as shown in the corrected drawing attached.

Figure 3:
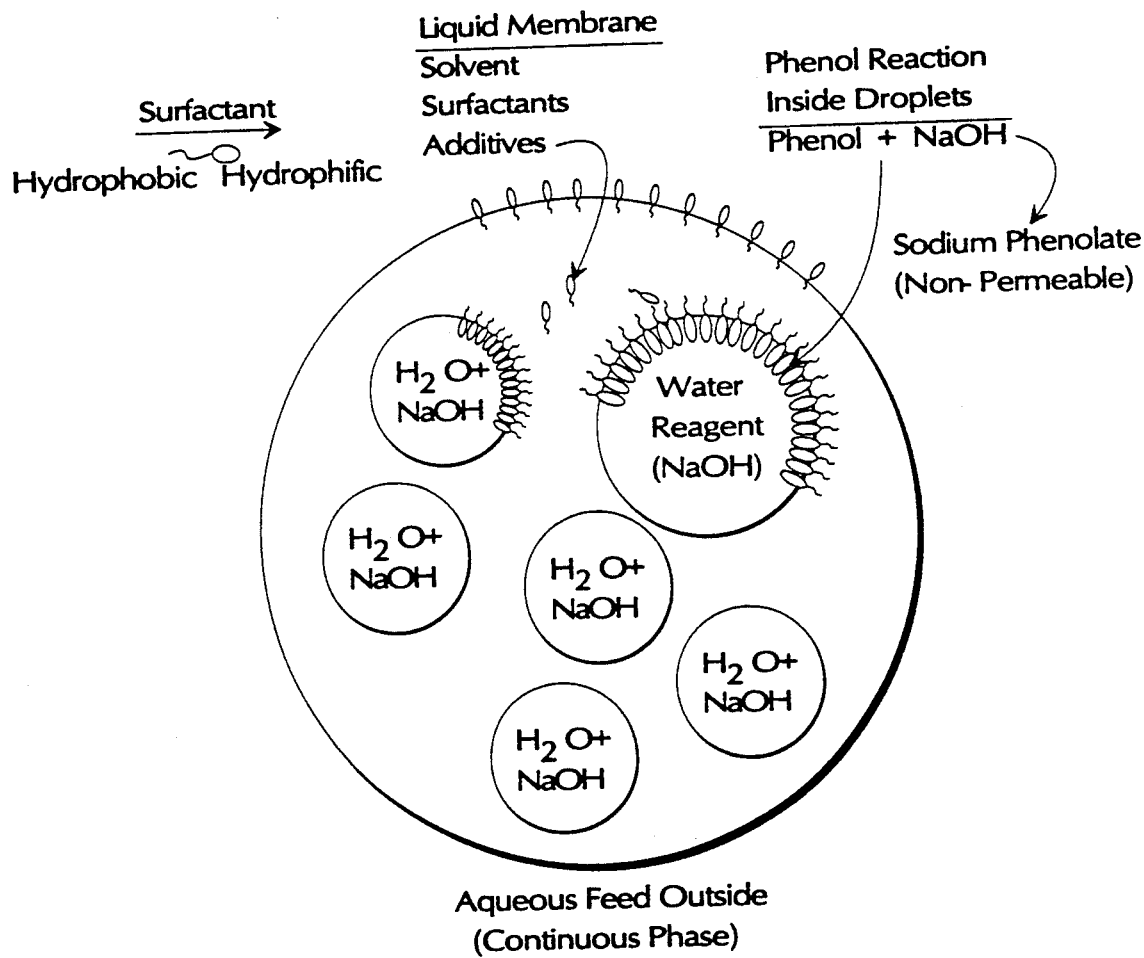
FIG. 3 is a schematic diagram of a liquid membrane for phenol and acid extraction.

On sheet 2 of 10, Fig. 3, change "hydrophific" to "Hydropilic"; change the location of the arrow from "additive"; add a "+" to read "water + reagent", as shown in the corrected drawing attached.

On sheet 3 of 10, Fig. 4, add data points, as shown in the corrected drawing attached.

On sheet 4 of 10, Fig. 5, add data points; change "89.9cps at zero shera rate" to "89.9 cps at zero shear rate", as shown in the corrected drawing attached.

On sheet 5 of 10, Fig. 6, add data points as shown in the corrected drawing attached.

On sheet 6 of 10, Fig. 7, add data points as shown in the corrected drawing attached.

Figure 8:
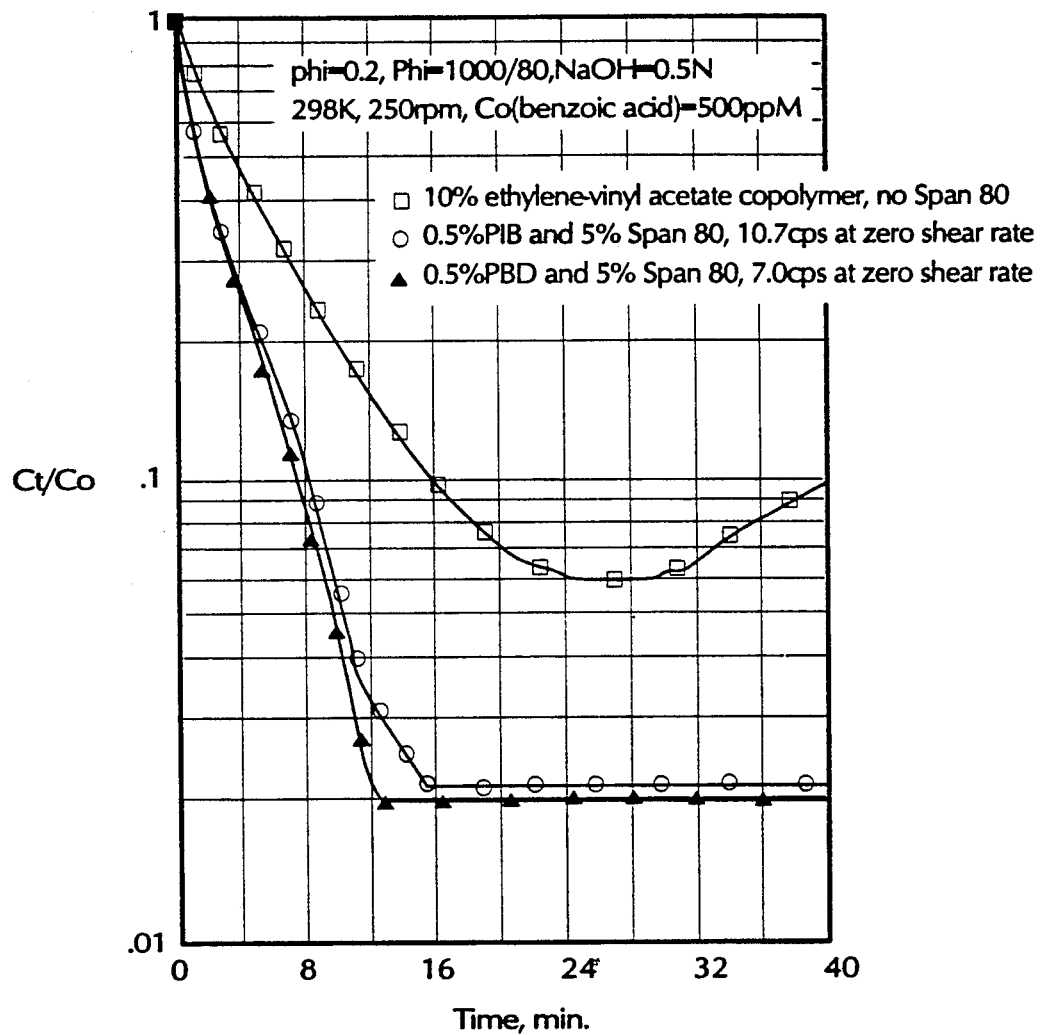

On sheet 7 of 10, Fig. 8, add data points as shown in the corrected drawing attached.

On sheet 10 of 10, Fig. 11, add data points as shown in the corrected drawing attached.

Signed and Sealed this

Eighth Day of August, 1995

*Attest:*

BRUCE LEHMAN

*Attesting Officer*     *Commissioner of Patents and Trademarks*

Schematic of Liquid membrane for phenol and acid extraction

Effect of PIB on benzoic acid extraction at 2% Span 80

Time, min.
Effect of polymer on benzoic acid extraction

Effect of PIB on the extraction of benzoic acid

Effect of polybutadiene on the extraction of benzoic acid

Comparison of a membrane containing a surface active copolymer (EVA) of low molecular weight (2000) & high concentration (10%) with my membrane containing non-surface active polymers of high molecular weight & low concentration.

Extraction of ammonia with different membranes at 2% Span 80